United States Patent Office 2,719,865
Patented Oct. 4, 1955

2,719,865

PREPARATION OF OXYARYL-TRICHLORO-METHYL-CARBINOLS

Norman E. Searle, Wilmington, Del., assignor to E. I. du Pont de Nemours and Company, Wilmington, Del., a corporation of Delaware No Drawing. Application July 25, 1952, Serial No. 300,987

6 Claims. (Cl. 260—613)

This invention relates to methods for reacting an aryl ether with chloral to obtain a corresponding oxyaryl trichloromethyl carbinol, ROArCH(OH)CCl₃, where R is an organic substituent and Ar is an aromatic structure. More particularly, it is directed to processes in which chloral is condensed in the presence of an aliphatic ether and aluminum chloride with an aryl ether, ROAr, having replaceable hydrogen.

It has heretofore been suggested to prepare aryl trichloromethyl carbinols by reaction of an aryl aldehyde with chloroform in the presence of an alkali metal hydroxide. Howard and Castel, J. Am. Chem. Soc. 57, 376 (1935) and Bergmann, Ginsburg and Lavie, J. Am. Chem. Soc. 72, 5012 (1950). The condensation of certain aryl ethers such as anisole with chloral using aluminum chloride as a catalyst has been shown to give the bis compound, for example, 2,2-bis(4-methoxyphenyl)-1,1,1-trichloroethane, rather than the oxyaryl trichloromethyl carbinol. Frankforter et al, J. Am. Chem. Soc. 36, 1511 (1914) and Shirley U. S. 2,484,057.

I have now found an improved method for obtaining oxyphenyltrichloromethyl carbinols by reaction of chloral with an aromatic ether in the presence of aluminum chloride catalyst. According to the invention, such reaction is carried out in the presence of an aliphatic ether. The ether acts in some way that is not completely understood to terminate the reaction at the carbinol stage and thus substantially eliminate formation of the bis-oxyaryltrichloroethane compound, (ROAr)₂CHCCl₃.

In carrying out the processes according to the invention, the aromatic ether and chloral are brought together in a liquid system in the presence of an amount of aluminum chloride at least stoichiometrically equivalent to the chloral used. It is not necessary to have present more than one mol of the aromatic ether per mol of chloral although two mols or more per mol of chloral can be used if desired, the excess merely serving as a diluent.

The following detailed specific examples illustrate processes of the invention.

*Example 1*

Anhydrous aluminum chloride, 66.5 g. (0.5 mole), was added portionwise to a solution of 108 g. (1.0 mole) of anisole in 190 g. of di-n-butyl ether while agitating the solution and maintaining the temperature in the range of 25–35° C.

After all the aluminum chloride had dissolved, 74 g. (0.5 mole) of chloral was added over a period of five minutes. There was only a slight exothermic effect during this operation. Stirring was continued for twenty minutes after completion of the chloral addition. The reaction mixture was then poured into water and steam distilled.

An organic layer, 270 g. on a dry basis, was obtained from the distillate. It contained dibutyl ether and 80 g. of anisole. The organic residue remaining in the distillation vessel was distilled at 1 mm. Hg, and 55 g. of p-methoxyphenyltrichloromethyl carbinol was collected at 156–160° C., $n_D^{27}$=1.5688. This recovery of the product corresponds to an 83% yield based on consumed anisole.

It will be noted in the foregoing example that the ratios of reactants and the order of addition favored the formation of 2,2-bis(p-methoxyphenyl)-1,1,1-trichloroethane instead of the carbinol. Thus, the modifying action of the aliphatic ether is marked since none of the bis compound was obtained.

*Example 2*

The procedure of Example 1 was repeated using veratrole as the aromatic compound instead of anisole. 276 g. (2 moles) of veratrole, 295 g. (2 moles) of chloral and 267 g. (2 moles) of aluminum chloride were used. There was obtained 111 parts by weight by the product 2,4-dimethoxyphenyltrichloromethyl carbinol. The product was a white crystalline material melting at 138.5–139° C.

Analysis calcd. for $C_{10}H_{11}Cl_3O_2$: Cl, 37.4. Found: Cl, 37.2.

*Example 3*

To 100 ml. of dry diethyl ether there was slowly added 67 g. (0.5 mole) of aluminum chloride with stirring and sufficient cooling to keep the temperature below 10° C. A mixture of 73.7 g. (0.5 mole) of chloral and 54.0 g. (0.5 mole) of anisole was then slowly added to the aluminum chloride solution with sufficient cooling to maintain the temperature at about 9° C. After the addition had been completed (8 minutes), the reaction mixture was allowed to warm up to 20° C. and was maintained at that temperature with stirring for a period of approximately 16 hours. The purple solution was poured into 400 ml. of ice containing about 20 ml. of concentrated hydrochloric acid. The ether solution was separated, washed with water, 5% sodium carbonate solution, and three times with water (until neutral). After distilling of the solvents, the product was subjected to a rough distillation in vacuo from which 8.9 g. of anisole was recovered together with the crude p-methoxyphenyltrichloromethyl carbinol distilling at 139–141° C./0.5 mm. On redistillation through an 8-inch Vigreux column, 70.5 g. of a very viscous, slightly yellow oil distilling at 131–2° C./0.5 mm. was obtained, $n_D^{25}$ 1.5707. The carbinol crystallized almost completely on standing three days.

Analysis calcd. for $C_9H_9Cl_3O_2$: Cl, 41.7. Found: Cl, 41.94, 41.99, 41.71.

*Example 4* p-Ethoxyphenyltrichloromethyl carbinol was prepared by a method identical with that described above for the aluminum chloride-ether catalyzed condensation of anisole with chloral, except that 61.1 g. (0.5 mole) of phenetole was substituted for the anisole, the reaction time was cut to two hours and the temperature was allowed to rise to 40° C. The yield of product was 91.1 g. of a slightly yellow, very viscous oil distilling at 137–140° C./0.48 mm. through an 8-inch Vigreux column.

Analysis calcd. for $C_{10}H_{11}Cl_3O_2$: Cl, 39.55. Found: Cl, 39.92, 39.88, 39.81.

*Example 5*

An ether solution of aluminum chloride was prepared by dissolving 67 g. (0.5 mole) of anhydrous aluminum chloride in 100 ml. of anhydrous diethyl ether with stirring and sufficient cooling to keep the temperature below 10° C. To this catalyst solution there was added from a separatory funnel a mixture of 60.0 g. (0.4 mole) of n-butyl phenyl ether (4173-124) and 66.4 g. (0.45 mole)

of chloral over a period of one hour during which the temperature was allowed to rise from 14 to 38° C. During the course of the next hour the temperature was kept between 38 and 55° C., after which the reaction mixture was cooled and poured into a mixture of about 300 g. of ice and 20 ml. of concentrated hydrochloric acid. The oily product was separated with ethylene chloride and washed thoroughly with dilute hydrochloric acid (3 times) and with water (7 times) until neutral. After drying over sodium sulfate, the solution was distilled. The product was obtained as 60.7 g. of viscous, slightly yellow oil distilling between 156 and 165° C./0.65–0.67 mm., $n_D^{25}$ 1.5438.

Analysis calcd. for $C_{12}H_{15}Cl_3O_2$: Cl, 35.8. Found: Cl, 35.7, 35.7, 35.9.

*Example 6*

Eighty grams (0.6 mole) of aluminum chloride was added cautiously and with stirring through a sealed addition flask to 250 ml. of anhydrous diethyl ether. During the addition, sufficient cooling was applied to the flask to maintain the temperature below 30° C. To this catalyst solution, a mixture of 55.3 g. (0.4 mole) of veratrole and 66.4 g. (0.45 mole) of chloral was added with stirring and sufficient cooling to keep the temperature at 10° C. The reaction was allowed to proceed for 4.5 hours, during which the temperature was permitted to rise to a maximum of 37° at the end of this period. The blue-black solution was poured into 500 ml. of ice containing 25 ml. of concentrated hydrochloric acid. After decomposition was completed, the light yellow oil layer was separated with ether and the aqueous layer extracted once with ether. The combined ether solutions were washed with 1N hydrochloric acid and followed by water washes until neutral. After drying over calcium chloride, the solvent was removed by distillation in vacuo, and the product appeared as white crystals contaminated with unreacted veratrole. The latter was removed by distillation under 0.8 mm. pressure, leaving the residue of crude carbinol which consisted of 67.7 g. of oily crystals. These were purified from cyclohexane containing methyl ethyl ketone. The yield was 26.1 g. The melting point of this product was raised from 133.1–134.2° to 135–135.6° by a second recrystallization from xylene.

Analysis calcd. for $C_{10}H_{11}Cl_3O_3$: Cl, 37.3. Found: Cl, 36.6, 36.8.

*Example 7*

A solution of 66.4 g. (0.45 mole) of chloral and 57.0 g. (0.40 mole) of o-chloroanisole was added with stirring and cooling to the aluminum chloride-ether catalyst prepared as described above from 86.5 g. (0.5 mole) of aluminum chloride and 150 ml. of anhydrous diethyl ether. The reaction was run at 34.5–45° for 1.6 hours and allowed to stand at room temperature for 17 hours. The product was worked up by the method described above and the 3-chloro-4-methoxyphenyltrichloromethyl carbinol was recovered by distillation as a greenish-yellow, very viscous liquid boiling at 146.0°/0.22 mm. to 150.0°/0.35 mm. The yield was 13.1 g., $n_D^{25}$ 1.5775.

Analysis calcd. for $C_9H_8Cl_4O_2$: Cl, 49.0. Found: Cl, 49.8, 49.9, 49.5.

*Example 8*

Using the method of experiment 7, there was obtained from 39.5 g. (0.25 mole) of alpha-naphthol methyl ether, 41.5 g. (0.28 mole) of chloral, 50 g. (0.375 mole) of anhydrous aluminum chloride and 156 ml. of anhydrous diethyl ether, 63.5 g. of crude 4-methoxynaphthyltrichloromethyl carbinol. This crude product was obtained as clear crystals melting at 155–160° C. with decomposition. After twice recrystallizing, first from xylene-cyclohexane and finally from benzene-cyclohexane, 18.2 g. of nearly white crystals melting at 160.5–161.3° were obtained.

Analysis calcd. for $C_{13}H_{11}Cl_3O_2$: Cl, 34.6. Found: Cl, 34.3, 34.5.

*Example 9*

To a solution of 67 g. (0.5 mole) of anhydrous aluminum chloride in 100 ml. of anhydrous diethyl ether, there was added a mixture of 85.1 g. (0.5 mole) of diphenyl ether and 73.7 g. (0.5 mole) of chloral over a period of 30 minutes, during which time the temperature was allowed to rise from 20° to 42.8°. The reaction was continued with stirring for 4 hours while maintaining the temperature at approximately 50° C. The dark purple reaction product was poured into 40 ml. of ice containing 20 ml. of concentrated hydrochloric acid. The light brown oil was separated with methylene chloride and washed with water and sodium bicarbonate solution until neutral. After topping off unreacted diphenyl ether (23.8 g.) at 0.5 mm., there remained 114.2 g. of crude reaction product as a brown viscous oil.

A 15.1 g. sample of the crude product was distilled through a small molecular still, yielding 3.3 g. of a slightly yellow, very viscous oil that distilled at approximately 108°/0.001 mm., $n_D^{25}$ 1.5980.

Analysis calcd. for $C_{14}H_{12}Cl_3O_2$: Cl, 33.55. Found: Cl, 34.16, 33.93.

A wide variety of aryl ethers can be used as reactants in processes of the invention as will be apparent from the foregoing examples. Broadly those aryl ethers suitable for use in processes of the invention are represented by the formula ROAr where R is an organic substituent that is unreactive in the condensation reaction of the invention; it can be aliphatic or aromatic and preferably is alkyl containing 1 to 5 carbon atoms or phenyl, Ar is an aromatic structure preferably phenyl or naphthyl, which structure can contain in addition to the ether substituent one or two other substituents that are nonreactive in the process, such as alkyl containing from 1 to 5 carbon atoms, alkoxy containing from 1 to 5 carbon atoms, halogen and phenyl.

Aliphatic ethers as a class appear to have the unique property of regulating the condensation as described; and any one or more of the liquid aliphatic ethers, either straight or branched chain, and either symmetrical or mixed, can be used, but the ether should not, of course, contain non-etherous functional groups that react under the process conditions.

Preferably, the ether used is a dialkyl ether which for practical purposes contains not more than about 10 carbon atoms. Still more preferably, it is a symmetrical lower dialkyl ether, that is, one in which each alkyl group contains not more than 5 carbon atoms, and is liquid at the reaction temperature.

Illustrative of suitable aliphatic ethers are diethyl ether, dibutyl ether, diisopropyl ether, ethyl n-butyl ether, diamyl ether, and ethylene glycol dimethyl ether.

The amount of aliphatic ether used in the process of the invention can be varied considerably. Best results are obtained by using not substantially less than about one mol of the ether for each mol of aluminum chloride. If desired, the ether can be used in large excess to serve in effect as a solvent or diluent for the reaction mass.

At least about an equimolar amount of aluminum chloride, based on the chloral used, is used, and, in general, satisfactory results are obtained using from about one to two mols of aluminum chloride per mol of chloral, with some variation being required for optimum results depending upon the particular monocyclic aromatic reactant employed.

The optimum reaction temperature varies with the reactivity of the aromatic reactant as well as the amount of catalyst. Ordinarily, the condensation reactions of the invention are carried out at somewhat elevated temperatures in the order of 25 to 50° C. In most cases, it is undesirable to operate above about 50° C. Temperatures below 25° C. down to zero or below can be used but this requires expensive refrigeration equipment in commercial operation and, in general, it retards the reaction unnecessarily.

I claim:

1. A process for the manufacture of an oxyaryltrichloromethyl carbinol which comprises condensing chloral in the presence of an aliphatic ether and aluminum chloride with an aryl ether having replaceable hydrogen, at least about one mol of aluminum chloride being used per mol of chloral and at least about one mol of the aliphatic ether being used per mol of aluminum chloride.

2. A process for the manufacture of an oxyphenyltrichloromethyl carbinol which comprises condensing chloral in the presence of an aliphatic ether and aluminum chloride with phenyl ether having a replaceable hydrogen, at least about one mol of aluminum chloride being used per mol of chloral and at least about one mol of the aliphatic ether being used per mol of aluminum chloride.

3. A process for the manufacture of an alkoxyphenyltrichloromethyl carbinol which comprises condensing chloral in the presence of a dialkyl ether and aluminum chloride with a compound represented by ROAr where R is alkyl containing 1 to 5 carbon atoms inclusive, and Ar is a monocyclic aromatic radical, at least about one mol of aluminum chloride being used per mol of chloral and at least about one mol of the dialkyl ether being used per mol of aluminum chloride.

4. A process for the manufacture of an alkoxyphenyltrichloromethyl carbinol which comprises condensing chloral in the presence of a symmetrical dialkyl ether in which each alkyl group contains up to five carbon atoms and aluminum chloride at a temperature of 25 to 50° C. with a compound represented by ROAr where R is alkyl containing 1 to 5 carbon atoms inclusive, and Ar is phenyl, at least about one mol of aluminum chloride being used per mol of chloral and at least about one mol of the dialkyl ether being used per mol of aluminum chloride.

5. A process for the manufacture of p-methoxyphenyltrichloromethyl carbinol which comprises condensing chloral with anisole in the presence of an aliphatic ether and aluminum chloride, at least about one mol of aluminum chloride being used per mol of chloral and at least about one mol of the aliphatic ether being used per mol of aluminum chloride.

6. A process for the manufacture of p-methoxyphenyltrichloromethyl carbinol which comprises condensing chloral with anisole in the presence of a symmetrical dialkyl ether and aluminum chloride at a temperature of 25 to 50° C., at least about one mol of aluminum chloride being used per mol of chloral and at least about one mol of the dialkyl ether being used per mol of aluminum chloride.

References Cited in the file of this patent

UNITED STATES PATENTS

| | | |
|---|---|---|
| 2,426,417 | Searle | Aug. 26, 1947 |
| 2,484,057 | Shirley | Oct. 11, 1949 |